Figure 1A:
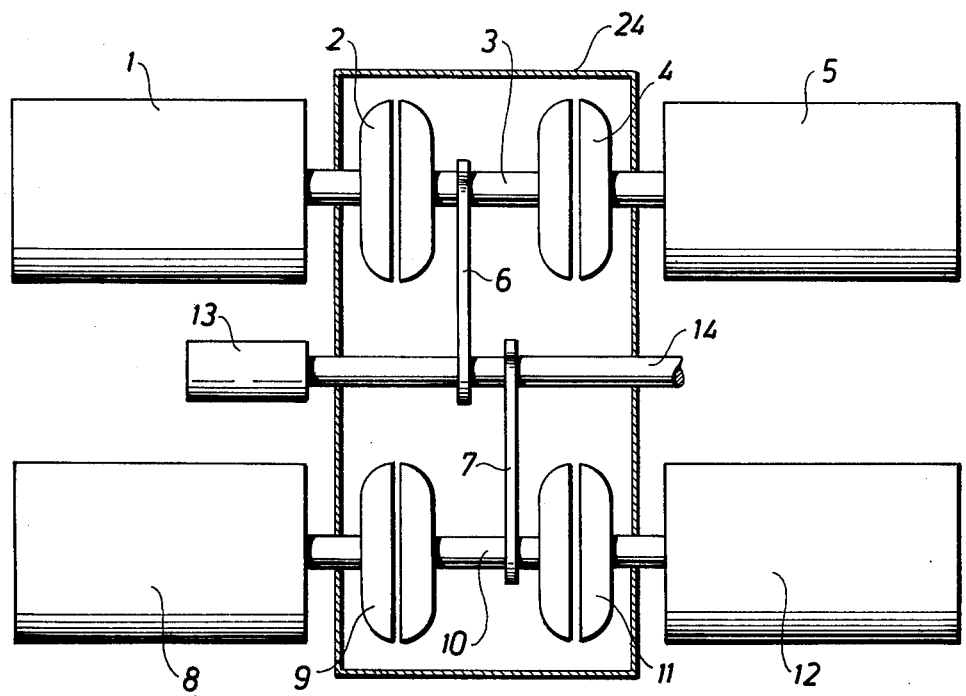

United States Patent [19]

Wallander

[11] 4,059,027
[45] Nov. 22, 1977

[54] MULTI-ENGINE ASSEMBLY

[75] Inventor: Bengt Olof Henrik Wallander, Stockholm, Sweden

[73] Assignee: Conort Engineering AB, Stockholm, Sweden

[21] Appl. No.: 676,868

[22] Filed: Apr. 14, 1976

Related U.S. Application Data

[63] Continuation of Ser. No. 451,015, March 14, 1974.

[30] Foreign Application Priority Data

Mar. 14, 1973 Sweden .................................. 7303907

[51] Int. Cl.² ............................................. F16H 47/00
[52] U.S. Cl. ................................................... 74/718
[58] Field of Search .................... 74/661, 665 B, 718, 74/732

[56] References Cited

U.S. PATENT DOCUMENTS

| 2,311,597 | 2/1943 | Schmitter | 74/661 |
| 2,589,788 | 3/1952 | Fell | 60/718 X |
| 2,867,080 | 1/1959 | Peras | 60/718 X |

FOREIGN PATENT DOCUMENTS 318,102  7/1929  United Kingdom .................. 60/718

Primary Examiner—Leonard H. Gerin
Attorney, Agent, or Firm—Burgess, Ryan and Wayne

[57] ABSTRACT

A multi-engine assembly comprising a plurality of small, light weight and high efficiency type engines, preferably of the two stroke type, connected by a hydraulic power transmission to a common output shaft, and capable of being selectively connected or disconnected to the drive upon demand.

9 Claims, 5 Drawing Figures

MULTI-ENGINE ASSEMBLY

This is a continuation, application Serial No. 451,015, filed March 14, 1974

The present invention relates in general to transmission devices, and the invention is especially directed to such a device that permits a plurality of small, preferably high speed combustion engines of the high efficiency type to drive a common output shaft.

Ever since mass produced cheap engines of the above mentioned type (generally intended for motor cycles, outboard motors, small cars and the like) appeared on the market, attempts have been made to use different devices for interconnecting engines into a motor assembly comprising several engines. This type of small engine often has properties which, in relation to its price, are superior to bigger motors of the same type. This fact applies especially to the effect/weight and the effect/cylinder volume ratio. The last mentioned ratio is of course of vital importance in connection with racing engines since these engines are often restricted to determined cylinder volumes within the stipulated classes. A number of devices have been tried with very disappointing results.

The basis for this fact is that when interconnecting several engines of the above indicated type by the previously tried devices, an interaction is obtained between disturbances (in the form of natural resonance vibrations, irregularities during the combustion, degree of irregularity, and the like) from the different engines, whereby breakdown of the device occurs at an accelerated rate decreasing the power output of the assembly and at the same time the engines are often damaged.

Previously tried devices are, e.g., transmissions comprising cone belts, toothed belts, hydrostatic transmission means, toothed wheel gearings and roller chains. Oscillation damping devices provided in the assembly experience the same damage as has been indicated above. Further, flexible clutches of the rubber type will rapidly experience thermal break down. In order to make the severity of this problem clear, it should be mentioned that the Swedish firm SAAB after a comprehensive effort, succeeded in producing an assembly comprising two trimmed SAAB 850 cc two stroke engines that lasted 15 minutes for a record test upon "the flying kilometer". The interconnecting device was, in that connection, a very heavy gearing of great mass and comprising short, cut off teeth.

There is hence no device available on the market which, in a technically acceptable way, permits interconnection of engines or motors of the above mentioned type and no successful tests have been described.

In accordance with the present invention, an assembly is obtained which does not experience any accelerated wearing and detrimental effects upon the operative life length of the engines. The explanation as to why the invention is successful is that the transmissions provided in the assembly according to the invention prevents disturbances from the different engines from interacting. The engines are so assembled that at least one transmission is provided in the connection between two engines.

In connection with heavier uses within mainly the ship and motor rail car technical fields, it has been possible to utilize the many advantages obtained by a driving assembly comprising a plurality of engines driving the same shaft. Cone belts and gearings have successfully been used. In order to damp the stresses exerted upon gearings and shafts during connecting operations and changes of rotational speed, and in order to balance the torque impacts from the individual piston strokes of the engine which otherwise may give rise to high stresses, since strong moments of inertia are involved, e.g., in connection with heavier diesel engines operating within the medium rotational velocity speed range, in connection with a one or multi-engine arrangement, a hydraulic connection is provided between the engines and the transmission means. This will, as a rule, result in the fact that shafts and transmission elements in both said cases can be constructed with somewhat smaller dimensions. One example of such constructions is the arrangement illustrated and described in the Swedish Pat. Specification No. 221,419 wherein a driving assembly for a motor vehicle is described comprising partly a gas turbine and a diesel engine selectively connected to a common output shaft via a gear assembly. The gear assembly is a mechanical device comprising two planetary gearings to which the gas turbine and the diesel engine are connected via disconnectable freewheel mechanisms. In one embodiment, the diesel engine is connected directly to the gearing and in another embodiment, it is connected via a hydraulic torque converter. The above-mentioned fact illustrates that the connections in such heavier applications serve a completely different purpose than the assembly according to the present invention.

Extremely low weight and a very efficient use of the present invention are obtained in connection with the preferred embodiment of the invention wherein it is possible at the same time to use the connections for selectively engaging and disengaging the driving motors. In such a way an engine with a tendency to break down can be disengaged and hence, a total break down can be prevented. This characteristic is especially important in connection with extremely trimmed engines where break down is rather common. Furthermore, the possibility exists that additional engines may be engaged upon demand, so that it is possible to run the engines at every driving condition with the most suitable effect from the efficiency and environmental point of view. It is only necessary to arrange a starter motor in connection with one engine, which then, upon engagement starts the rest of the engines.

A typical example of an engine which the present invention makes it possible to use in an engine arrangement comprising a plurality of high RPM engines, preferably of the two stroke type.

Other objects of the invention will become evident from the following description of a preferred embodiment of the invention, the attached claims as well as the attached drawings and will additionally be understood by a man skilled in the art.

The objects of the invention are obtained by the characterizing features according to the invention indicated in the attached claims.

Figure 1B:
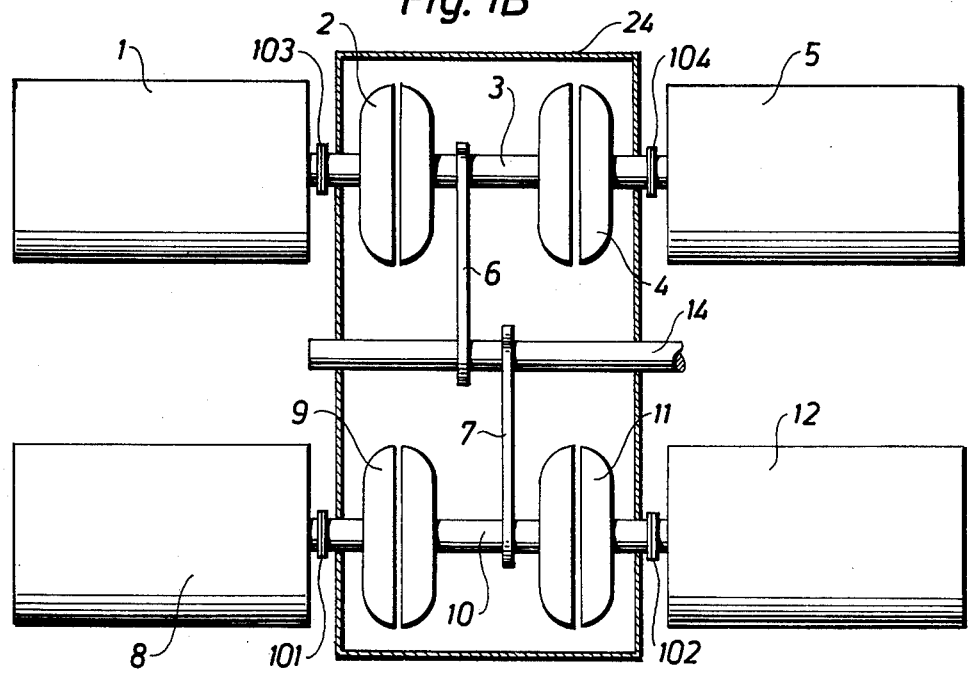
Figures 2, 3:
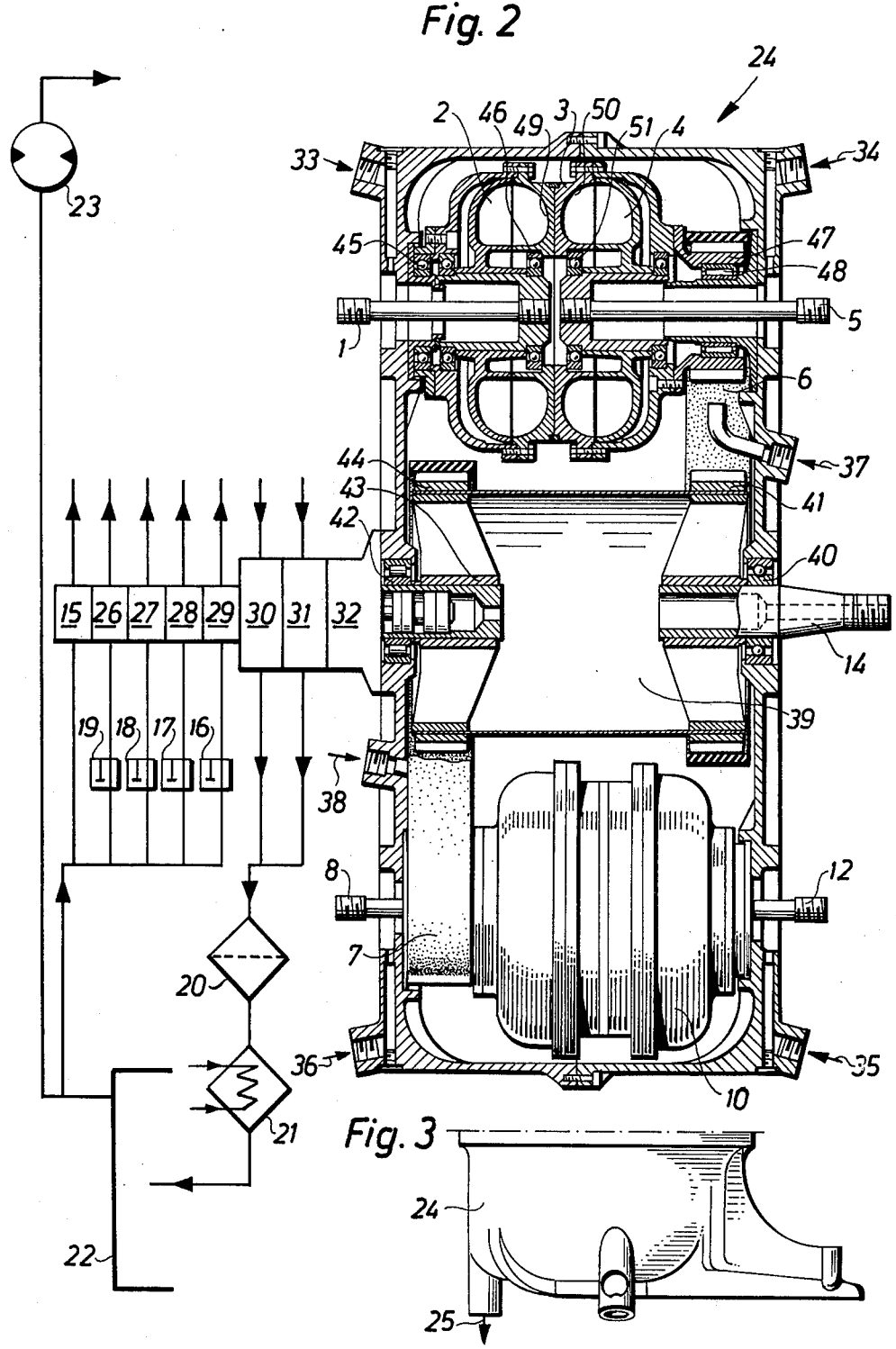
Figure 4:
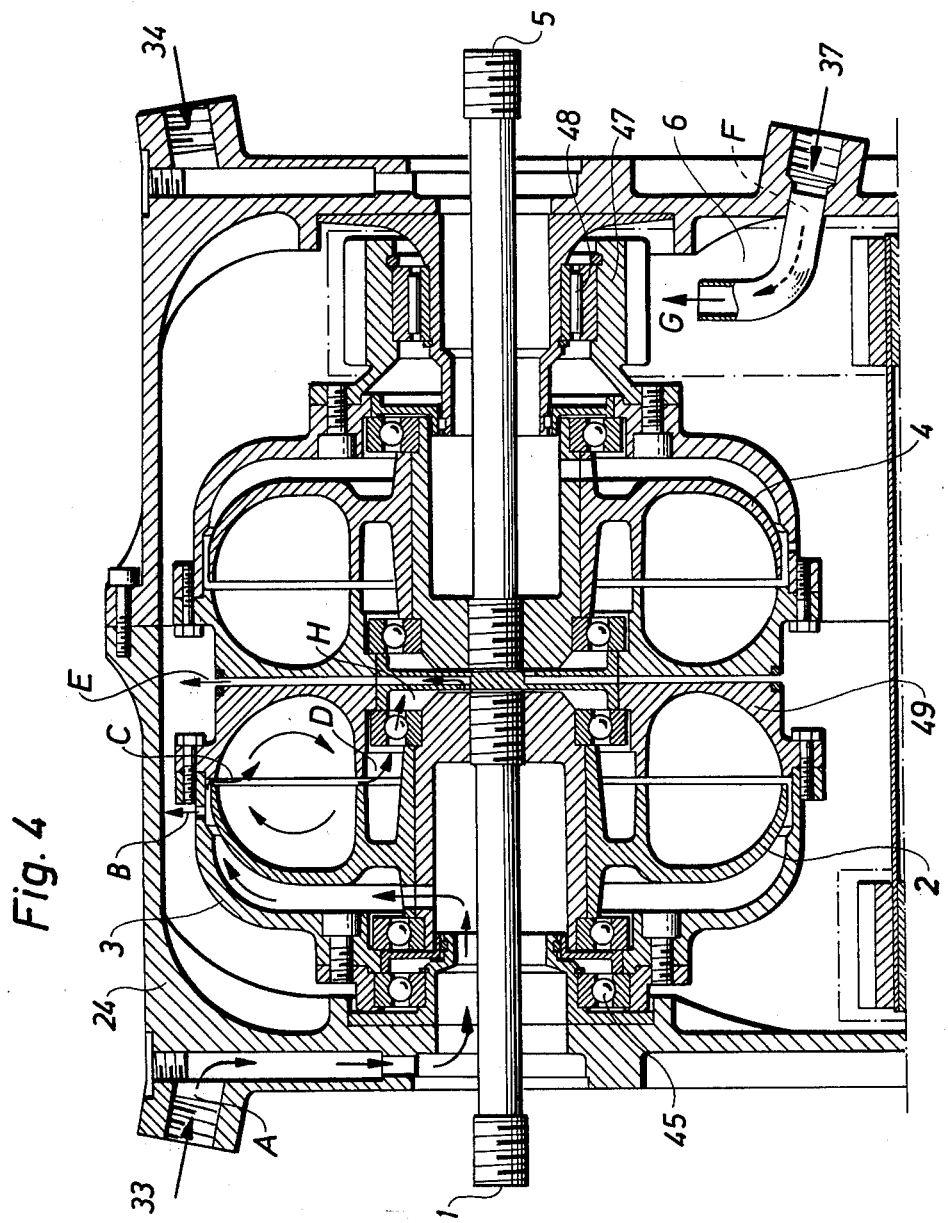

One embodiment of the invention will below be described with reference to the attached drawings, wherein FIG. 1A and FIG. 1B are schematic illustrations of the general construction of a multi-engine assembly comprising the transmission means according to the invention, FIG. 2 is an illustration of a presently preferred embodiment of a multi-engine assembly according to the invention wherein the upper half is a section through the device and the bottom half illustrates the transmission housing when the outer cover of the transmission device is removed, working medium pumps and conduits being schematically illustrated in the left hand side of the FIG., FIG. 3 is a side elevational view of the device according to FIG. 2, and FIG. 4 is a detailed sectional view of the upper half of FIG. 2 and illustrating the flowing paths for the combined working, cooling and greasing medium.

The general technique and construction of the device is illustrated in FIG. 1A. Four power means 1, 5, 8, 12 are connectable to a common output shaft 14 by the transmission device according to the invention. The output shafts of the respective power means are provided with impellers 2, 4, 9, 11, which in pairs, cooperate with transmission housings 3, 10 provided with turbine wheels arranged back to back. The transmission housings 3, 10 are constantly connected to the common output shaft 14 by power transmission means 6, 7 such as e.g., drive chains, drive belts, gearing transmissions or the like. The output shaft 14 extends through the outer cover 24 and is provided with auxiliary means 13 such as working medium pumps and the like on the opposite outer portion thereof.

FIG. 2 illustrates the complete, presently preferred construction wherein the left hand side of the FIG. schematically illustrates the different auxiliary means being indicated at 13 in FIG. 1A, said auxiliary means comprising a gear mechanism 32 between the output shaft 14 and the pumps, feeding pumps 26 – 29 for feeding working medium from an oil container to the transmission device, priming pumps 30, 31 for pumping working medium from the transmission device to a filter 20, an oil cooler 21 and an oil container 22, as well as an independently driven start oil pump 23. Valves 16, 17, 18, 19 are provided between the oil container 22 and the feeding pumps 26 – 29, and the feeding to the feeding pumps 26 – 29 constantly driven by the output shaft 14 could be interrupted or started by the said valves. The independently driven start oil pump 23, which is separately drivable, is interconnected between the container 22 and the inlet 33.

The working medium inlets to the transmission device are on the drawing indicated by 34 for the motor 5, by 35 for the motor 12, by 36 for the motor 8 and by 33 for the motor 1, said inlets being connected to the respective feeding pump as is indicated by the arrows from the feeding pumps 26 – 29 while the priming pumps 30, 31 are connected to the outlet 25 (compare FIG. 3) from the outer cover 24 and corresponding outlets (not illustrated on FIG. 2) in the other half of the outer cover. The feeding pump indicated at 15 is connected to both the inlets 37 and 38 supplying the respective power transmission means 6 and 7 with a lubricating medium.

The output shaft 14 is journalled in the outer cover 24 at 40 and 42 and at the intermediate portion thereof it merges into a compound shaft 39 provided with cog gear wheels 41 and 44 attached thereto. The gear wheel 41 is engaged with the power transmission means 6, which suitably could be a chain comprising a plurality of transversely located link belts. The power transmission means 6 is also in engagement with the gear 47 provided on the transmission housing 3. A similar power transmission means 7 is in a similar way provided in engagement with the wheel 44 upon the compound shaft 39, and a gear, not shown, on the transmission housing 10.

Since the portion of the power transmission device according to FIG. 2 illustrated under the shaft 14 is identical to the portion illustrated above the shaft 14, but mounted in an inverted way due to the fact that the driving chain 7 thereof meshes with the gear 44, only the upper portion illustrated on FIG. 2 will be described in detail.

FIG. 4 illustrates, in a sectional view, one half of a multi-engine assembly provided with a power transmission device according to the invention, and in the FIG. the flowing paths for the combined working, cooling and lubricating medium are indicated by arrows. The flow path of the working medium is indicated by arrows in the left hand side portion of the FIG., and it can be seen that the working medium, preferably being oil pumped by the feeding pump 27 according to FIG. 2, enters the assembly at A through the inlet 33 and then flows in a suitable flow path indicated by arrows to the transmission housing 3 provided with a peripheral drainage outlet B, the purpose thereof being further described below. The greater portion of the working medium flow is then passing between the impeller and the turbine wheel at C and into the turbine vane system where, in the characteristic turbine construction way, it transmits momentum between the two portions of the impeller-turbine vane system. The working medium flow then passes through the gap D up to the central drainage outlet H, and into the outer cover at E. If the central drainage outlet at constant pressure and flow was very small and a greater portion of the drainage flow was evacuated through the outlet B the starting up time for the power transmission device would be unsuitably long, while if the drainage was carried out only at the central drainage outlet E the turbine circuit could not be emptied. A suitable proportion for the drainage is that the greater portion of the flow passes through the outlet E and a smaller portion thereof through the outlet B. It has been experienced in connection with the specific and preferred embodiment of the invention illustrated in the drawings, partly by calculations and partly in an empirical way, that the most suitable proportion is to have 75% of the drainage through outlet E and 25% through outlet B. However, it should be pointed out that these values of course can be varied depending on the specific demands in every specific case and the invention is not restricted to the indicated preferred values.

In the right hand side portion of FIG. 4, an inlet 37 for a lubricating agent is illustrated, said lubricating agent being fed by the pump 15 according to FIG. 2, to enter the assembly at F, is and intended for cooling and lubricating the wheel 47 and the chain 6. It is obvious that the pump 15 also feeds lubricating agent to the lubricating agent inlet 38 illustrated in FIG. 2 in order to cool and lubricate the chain 7.

The transmission housing 3 is, by bearings 45 and 48, journalled upon stub axles attached to the outer cover 24. The two impellers 2 and 4 are freely and independently rotatable in relation to each other and to the transmission housing 3, but they are each attached to their respective motor shafts indicated on FIG. 4 by 1 and 5, respectively.

The function of the power transmission device, according to the present invention, will now be described in detail with reference to the illustrated multi-engine assembly. The engine 1 of the multi-engine assembly is, e.g., started by a starter motor (not shown) and the engine 1 is at that point of time disengaged from the output shaft 14 of the engine assembly, since the transmission is empty. However, the impeller 2 thereof is fixedly connected to the output shaft of the engine 1 and follows the rotational movement of the shaft. The valve 18 is opened and the separately driven start oil pump 23 is started and pumps working medium to the inlet 33 and further on in the circulation path indicated by arrows, wherein the working medium at C flows into the space between the impeller 2 driven by the output shaft of motor 1 and the turbine wheel 49. Then, the working medium is evacuated or drained in the flow path indicated by arrows from D to E. When a sufficient filling of the turbine transmission is obtained, the power transmission housing 3 follows the rotation of the impeller 2 since the turbine wheel 49 is affixed to the power transmission housing 3. Then the gear 47 of the power transmission housing 3 will drive the chain 6 which transmits rotational movement to the output shaft 14 at the gear 41 of the compound shaft 39. The output shaft 14 starts to rotate and drives the pumps 15, 26 – 31, said pumps then rotating together with the rotation of the output shaft 14 whereby the pump 27, via the already opened valve 18, will supply the inlet 33 with oil. The independently driven pump 23 is stopped and does not need to be used until connection with the next starting up of the assembly.

If the motor 5 now also is to be connected to the driving system, the valve 16 is opened. The pump 29 feeds working medium to the inlet 34 and the working medium flows in the intended flow path to the space between the impeller 50 driven by the rotational movement of the transmission housing 3 and the turbine wheel 4, and when a sufficiently high hydraulic pressure has been built up therein, the turbine wheel 4 will follow the rotational movement and the engine 5 is "towed" to start. Then any of the additional engines 12, 8 can, upon demand, be started in a corresponding way by opening the valves 17 and 19, respectively, in order to connect the engine by starting the working medium circulation with the respective pumps 28 and 26.

The above given description regarding the structural nature and function of the device indicates that each single engine will be disconnected from the output shaft 14 and the rest of the assembly before the respective value is actuated. If it is desired to disconnect one engine, the or valve controlling the medium flow to the corresponding transmission is shut off. When no further working medium is supplied, the transmission will be emptied by the leakage flow through B and the engine will be disconnected from the assembly.

In a modified embodiment of the invention, air cooled, permanently filled hydraulic transmissions are used and the auxiliary elements 13 according to FIG. 1A are dispensable. However, since in such a case all the output shafts of the engines of the assembly constantly follow the rotational movement of the output shaft 14 If no disconnecting means are provided, it will, in such a case, be necessary to provide specific disconnecting means for one or more of the output shafts of the engines and this fact has schematically been indicated in FIG. 1B at 101, 102, 103 and 104, respectively. These disconnecting means could be of any previously known type, e.g., jaw clutch couplings or couplings of the friction type. It is also obvious that the auxiliary elements 13 could be replaced by an output shaft of another engine with or without such a disconnecting means. An embodiment wherein an engine is connected directly to the output shaft would also work sufficiently. However, such a configuration has the drawback that the engines could only run rather synchronously at a certain load for each certain rotational speed. This is based upon the fact that the difference between the rotational speed of the engines resulting from the slipping of the clutch must be compensated for by a fixed transmission ratio difference in the connections between the engine and the output shaft. The important fact is that there is at least one transmission circuit between two of the engines of the assembly so that there is no direct mechanical connection therebetween.

In spite of the fact that the embodiment illustrated in the drawings is using liquid cooling for the driving chains, it is obvious that the assembly also could be air cooled.

According to the present invention, a multi-engine assembly is obtained, wherein the engines involved add to the common output shaft torques, said engines preferably being separately connectable and disconnectable respectively, from the common output shaft, whereby the objects of the invention mentioned in the beginning of this description are obtained. Suitable applications for a multi-engine assembly according to the present invention are, e.g., in boats of different sizes, in ground vehicles, in hovercrafts, in snow vehicles and in aeroplanes, the specific suitable application in helicopters is to be noted due to the superior advantage obtained by the ability of the assembly to accelerate heavy masses with high inertia, i.e. the main rotor, without the need of extra coupling devices. Other applications could also of course be possible in connection with the present invention, e.g. in industrial plants. It also appears to be possible to use the assembly according to the invention to distribute torque to power receiving devices, such as pumps, from a common, driven input shaft. However, the main technical field for the invention appears at the moment to be within the transportation field.

Since many modifications and variations of the construction as well as the function would appear to be possible for one skilled in the art, the described and illustrated embodiments should only be interpreted as one suitable example of the invention, and the invention includes every construction falling with the defined scope of protection according to the attached claims.

What I claim is:

1. In a multi-engine assembly of the type having a plurality of internal combustion engines each having a drive shaft, a common output shaft, and selective power transfer means for coupling said drive shaft to said output shaft; the improvement wherein said power transfer means comprises hydro-dynamic transmission means having a rotatable housing, a pair of separate output turbines fixedly mounted in said housing, a pair of input impellers rotatably mounted in said housing in alignment with said separate turbines for fluid coupling therebetween, means coupling each input impeller to the output shaft of a separate engine, a mechanical interconnection direct drive means coupled between said housing and said output shaft for continuously coupling said output turbines to said output shaft, a corresponding plurality of fluid pumps directly and continuously coupled to and driven by said output shaft, separate valve means for connecting each of said fluid pumps to an associated power transfer means for selectively providing fluid coupling between corresponding impellers and turbines, and at least one starting motor for one of said internal combustion engines.

2. The multi-engine assembly of claim 1, wherein said engines are two stroke engines.

3. The multi-engine assembly of claim 1 further comprising a separately actuable selectively operable starter medium pump connected to one of said power transfer means.

4. The multi-engine assembly of claim 1 wherein said housing comprises means defining separate chambers in which corresponding impellers and turbines are positioned, said fluid inputs being coupled to separate said chambers, whereby fluid coupling may be selectively provided between corresponding impellers and turbines.

5. The multi-engine assembly of claim 4 comprising an outer cover, said housing being rotatably supported within said outer cover, said output shaft being rotatably supported to extend within said cover, whereby said direct drive means is positioned between said housing and output shaft within said cover, and wherein said fluid outputs extend from separate said chambers into said cover.

6. The multi-engine assembly of claim 5 further comprising fluid pump means coupled to said output shaft for directing cooling and lubricating fluid in said outer cover to lubricate said housing, output shaft and direct drive means.

7. The multi-engine assembly of claim 1 wherein said hydro-dynamic transmission means comprises an outer cover, said pair of housings being rotatably mounted in said cover, said output shaft extending into and being rotatably mounted in said cover, said direct drive means comprising means for separately directly coupling said housings to said output shaft, each of said housings comprising a pair of axially spaced apart chambers, said impellers extending into each of said chambers, and shaft means coupled to each of said impellers and extending through said outer cover for coupling to said engines, said fluid inputs and fluid outputs extending separately into each of said chambers, whereby when fluid is directed into a chamber by way of said fluid pump means and valve means, fluid coupling is provided between the respective impeller and turbine to effect rotation of the respective housing, and when fluid is not directed into a chamber, the respective impeller and turbine are uncoupled.

8. The multi-engine assembly of claim 7 wherein said turbines are disposed axially outwardly of the respective impellers in said housings.

9. The multi-engine assembly of claim 1 wherein said pump means comprises a separate fluid pump connected to each of said valve means.

* * * * *

UNITED STATES PATENT OFFICE
CERTIFICATE OF CORRECTION

Patent No. 4,059,027         Dated  November 22, 1977

Inventor(s)  Bengt Olof Henrik Wallander

It is certified that error appears in the above-identified patent and that said Letters Patent are hereby corrected as shown below:

In the title page, the priority date should read --March 20, 1973-- and the application number should be --7303907--.

Column 1, line 3: Delete the comma after "continuation"; after "application" insert --of--.

Column 2, line 48: "comprising" should be --comprises--.

Column 4, line 51: "is and" should be --and is--.

last line: Delete "point of".

Column 5, line 28: "is opened. The" should be --is opened and the--.

UNITED STATES PATENT OFFICE
CERTIFICATE OF CORRECTION

Patent No. 4,059,027  Dated November 22, 1977

Inventor(s) Bengt Olof Henrik Wallander

It is certified that error appears in the above-identified patent and that said Letters Patent are hereby corrected as shown below:

Column 5, line 29: "34 and the" should be --34. The--.

line 45: "value" should be --valve--.

line 46: Delete "or".

Column 6, line 44: "with" should be --within--.

Signed and Sealed this

Sixth Day of June 1978

[SEAL]

Attest:

RUTH C. MASON  
Attesting Officer

DONALD W. BANNER  
Commissioner of Patents and Trademarks